(12) United States Patent
Omeragic

(10) Patent No.: US 6,584,408 B2
(45) Date of Patent: Jun. 24, 2003

(54) SUBSURFACE FORMATION PARAMETERS FROM TRI-AXIAL MEASUREMENTS

(75) Inventor: Dzevat Omeragic, Sugar Land, TX (US)

(73) Assignee: Schlumberger Technology Corporation, Sugar Land, TX (US)

(*) Notice: Subject to any disclaimer, the term of this patent is extended or adjusted under 35 U.S.C. 154(b) by 2 days.

(21) Appl. No.: 09/893,175

(22) Filed: Jun. 26, 2001

(65) Prior Publication Data

US 2003/0055565 A1 Mar. 20, 2003

(51) Int. Cl.$^7$ ............... G01V 1/40; G01V 3/18; G01V 3/08
(52) U.S. Cl. ............... 702/7; 702/10; 324/338
(58) Field of Search ............... 702/7, 10; 324/338, 324/339, 343

(56) References Cited

U.S. PATENT DOCUMENTS

| | | | |
|---|---|---|---|
| 4,302,722 A | | 11/1981 | Gianzero |
| 5,115,198 A | | 5/1992 | Gianzero et al. |
| 5,329,448 A | * | 7/1994 | Rosthal ............... 702/7 |
| 5,757,191 A | | 5/1998 | Gianzero |
| 5,781,436 A | | 7/1998 | Forgang et al. |
| 5,886,526 A | * | 3/1999 | Wu ............... 324/338 |
| 5,999,883 A | | 12/1999 | Gupta et al. |
| 6,044,325 A | | 3/2000 | Chakravarthy et al. |
| 6,147,496 A | | 11/2000 | Strack et al. |
| 6,181,138 B1 | | 1/2001 | Hagiwara et al. |
| 6,385,545 B1 | * | 5/2002 | Wu ............... 702/10 |
| 6,393,364 B1 | * | 5/2002 | Gao et al. ............... 702/7 |

OTHER PUBLICATIONS

JH Moran and S Gianzero, "Effects of Formation Anistropy on Resistivity–Logging Measurements," *Geophysics*, pp. 1266–1286 (Jul. 1979).

BF Kriegshauser et al., "Increased Oil–in–Place in Low Resistivity Reservoirs from Multicomponent Induction Log Data," *SPWLA 41$^{st}$ Annual Logging Symposium*, Paper A, pp. 1–14 (Jun. 4–7, 2000).

BF Kriegshauser et al., "A New Multicomponent Induction Logging Tool to Resolve Anistropic Formations," *SPWLA 41$^{st}$ Annual Logging Symposium*, Paper D, pp. 1–14 (Jun. 4–7, 2000).

* cited by examiner

*Primary Examiner*—Edward Lefkowitz
*Assistant Examiner*—Toan Le
(74) *Attorney, Agent, or Firm*—Victor H. Segura; Brigitte L. Jeffery; John J. Ryberg

(57) ABSTRACT

Systems and methods are provided for determining various subsurface formation parameters from electromagnetic measurements. Formulas are disclosed for field components in a coordinate system tied to the logging tool. Closed form expressions for a magnetic field distribution in a homogeneous anisotropic medium are derived from Moran-Gianzero formulas. A complete coupling of a tri-axial system of transmitters and receivers is derived in the tool coordinate system, allowing direct inversion of the measurements for horizontal and vertical conductivity and dip and strike (dip-azimuth) angles. Closed form expressions for these four quantities in the low frequency limit are also derived.

21 Claims, 5 Drawing Sheets

ACQUIRE EM MEASUREMENTS (COUPLINGS) WITH A TOOL HAVING A TRI-AXIAL SYSTEM OF TRANSMITTER AND RECEIVER ANTENNAS — 50

SOLVE: $(T'_{zz} - L_h)(T'_{xx} - T_h) = (T'_{xz})^2$ FROM THE COUPLINGS OF 50 TO DETERMINE THE HORIZONTAL CONDUCTIVITY OF THE FORMATION — 55

COMPUTE RELATIVE DIP ANGLE FROM: $\alpha = \tan^{-1} \dfrac{T'_{xz}}{T_h - T'_{xx}}$ — 60

SOLVE FOR VERTICAL CONDUCTIVITY FROM:
$T'_{xx} + T'_{yy} + T'_{zz} = \dfrac{1}{4\pi}\left(\dfrac{k_h^2}{r} e^{ik_h r} + \dfrac{k_h k_v}{s} e^{ik_v s}\right)$ — 65

FIG. 3

SUBSURFACE FORMATION PARAMETERS FROM TRI-AXIAL MEASUREMENTS

1. BACKGROUND OF THE INVENTION

1.1 Field of the Invention

This invention relates to the field of well logging and, more particularly, to improved methods for processing electromagnetic (EM) measurements acquired with a logging tool disposed within homogeneous anisotropic formations to determine parameters of the formation.

1.2 Description of Related Art

Induction logging is a well-known form of EM logging in the field of hydrocarbon exploration and production. Conventional induction logging tools include a transmitter and a receiver array consisting of a set of coil antennas mounted on a support and axially spaced from each other in the direction of the borehole. The transmitter antenna is energized by an alternating current, which in turn generates an electric field that induces eddy currents in the formation surrounding the borehole. The intensity of the eddy currents is proportional to the conductivity of the formation. The field generated in turn by these eddy currents induces an electromotive force in the receiver antenna. The signals detected at a receiver antenna are usually expressed as a complex number (phasor voltage) and reflect interaction with the borehole fluid and the formation. By processing the acquired measurements, the formation and/or borehole parameters are determined.

A coil carrying a current can be represented as a magnetic dipole having a magnetic moment proportional to the current and the area encompassed by the coil. The direction and strength of the magnetic dipole moment can be represented by a vector perpendicular to the area encompassed by the coil. Typical logging tools are equipped with coils of the cylindrical solenoid type comprised of one or more turns of insulated conductor wire. Some logging tools are also implemented with saddle coil or flex circuit antenna configurations.

In conventional induction and propagation logging tools, the transmitter and receiver antennas are generally mounted with their axes along the longitudinal axis of the tool. An emerging technique in the field of well logging is the use of logging tools incorporating antennas having tilted or transverse coils, i.e., where the coil's axis is not parallel to the longitudinal axis of the support. These tools are thus implemented with antennas having a transverse or tilted magnetic dipole. One particular implementation uses a set of three coils having non-parallel axes (referred to herein as tri-axial). FIG. 1 shows a tri-axial transmitter and receiver antenna system wherein the coil axes are independently directed. The aim of these antenna configurations is to provide three-dimensional formation evaluation, including information about resistivity anisotropy in vertical wells and directional sensitivity to bed boundaries that can be used for navigation. Logging tools equipped with tri-axial antenna systems are described in U.S. Pat. Nos. 5,115,198, 5,781,436, 6,147,496, 5,757,191 and WO 00/50926.

The techniques for processing the acquired EM measurements into representative values of the formation parameters involve a number of mathematical calculations. U.S. Pat. No. 4,302,722 (assigned to the present assignee) describes techniques for determining formation conductivity and anisotropy parameters from the acquired measurements. U.S. Pat. Nos. 5,781,436, 5,999,883 and 6,044,325 describe methods for producing estimates of various formation parameters from tri-axial measurements.

It is desirable to obtain a simplified technique for processing EM measurement data, acquired from a logging tool, to determine parameters of a subsurface formation. Thus, there remains a need for simplified techniques for calculating complete couplings of tri-axial measurements to determine the formation parameters.

2. SUMMARY OF THE INVENTION

Systems and methods are provided for determining various subsurface formation parameters from electromagnetic measurements. The measurements are acquired with a logging tool adapted with a system of tri-axial transmitter and receiver antennas disposed within the formation.

One aspect of the invention provides a method for determining a formation parameter from EM measurements acquired with a tri-axial system of antennas. The method includes determining antenna couplings associated with the measurements. The following expression is then derived from the couplings and calculated to determine the horizontal conductivity of the formation:

$$(T'_{zz}-L_h)(T'_{xx}-T_h)=(T'_{xz})^2,$$

where $T'_{zz}$ is the coupling between a z-axis receiver antenna and a z-axis transmitter antenna; $T'_{xx}$ is the coupling between an x-axis receiver antenna and an x-axis transmitter antenna; $T'_{xz}$ is the coupling between an x-axis receiver antenna and a z-axis transmitter antenna; and $L_h$, $T_h$ are elementary functions corresponding to the couplings of said antennas.

Another aspect of the invention provides a method for determining a formation parameter from EM measurements acquired with a tri-axial system of antennas. The method includes determining antenna couplings associated with the measurements. The following expression is then derived from the couplings and calculated to determine the horizontal conductivity $\sigma_h$ of the formation:

$$\sigma_h = \frac{8\pi r}{\omega\mu} \frac{\text{Im}\{T'_{xx}\}\text{Im}\{T'_{zz}\} - \text{Im}\{T'_{xz}\}^2}{2\,\text{Im}\{T'_{xx}\} - \text{Im}\{T'_{zz}\}},$$

where $T'_{xx}$ is the coupling between an x-axis receiver antenna and an x-axis transmitter antenna; $T'_{zz}$ is the coupling between a z-axis receiver antenna and a z-axis transmitter antenna; $T'_{xz}$ is the coupling between an x-axis receiver antenna and a z-axis transmitter antenna; $\omega$ represents an angular frequency; $r$ is a separation distance between the antennas; and $\mu$ is a magnetic permeability constant.

Another aspect of the invention provides a system for determining a formation parameter from electromagnetic measurements. The system includes a tool adapted for disposal within the formation and equipped with a tri-axial system of transmitter and receiver antennas. The system further includes computation means for determining antenna couplings associated with the measurements, and for calculating the following expression derived from the couplings to determine the horizontal conductivity of the formation:

$$(T'_{zz}-L_h)(T'_{xx}-T_h)=(T'_{xz})^2,$$

where $T'_{zz}$ is the coupling between a z-axis receiver antenna and a z-axis transmitter antenna; $T'_{xx}$ is the coupling between an x-axis receiver antenna and an x-axis transmitter antenna; $T'_{xz}$ is the coupling between an x-axis receiver antenna and a z-axis transmitter antenna; and $L_h$, $T_h$ are elementary functions corresponding to the couplings.

Another aspect of the invention provides a system for determining a formation parameter from electromagnetic measurements. The system includes a tool adapted for disposal within the formation and equipped with a tri-axial system of transmitter and receiver antennas. The system further including computation means for determining antenna couplings associated with the measurements, and for calculating the following expression derived from the couplings to determine the horizontal conductivity $\sigma_h$ of the formation:

$$\sigma_h = \frac{8\pi r}{\omega\mu} \frac{\text{Im}\{T'_{xx}\}\text{Im}\{T'_{zz}\} - \text{Im}\{T'_{xz}\}^2}{2\,\text{Im}\{T'_{xx}\} - \text{Im}\{T'_{zz}\}},$$

where $T'_{xx}$ is the coupling between an x-axis receiver antenna and an x-axis transmitter antenna; $T'_{zz}$ is the coupling between a z-axis receiver antenna and a z-axis transmitter antenna; $T'_{xz}$ is the coupling between an x-axis receiver antenna and a z-axis transmitter antenna; $\omega$ represents an angular frequency; r is a separation distance between the antennas; and $\mu$ is a magnetic permeability constant.

3. BRIEF DESCRIPTION OF THE DRAWINGS

Other aspects and advantages of the invention will become apparent upon reading the following detailed description and upon reference to the drawings in which:

FIG. 3 shows a flow chart of a method for determining a parameter of a subsurface formation from electromagnetic measurements according to the invention.

4. DETAILED DESCRIPTION OF SPECIFIC EMBODIMENTS

Figure 1:
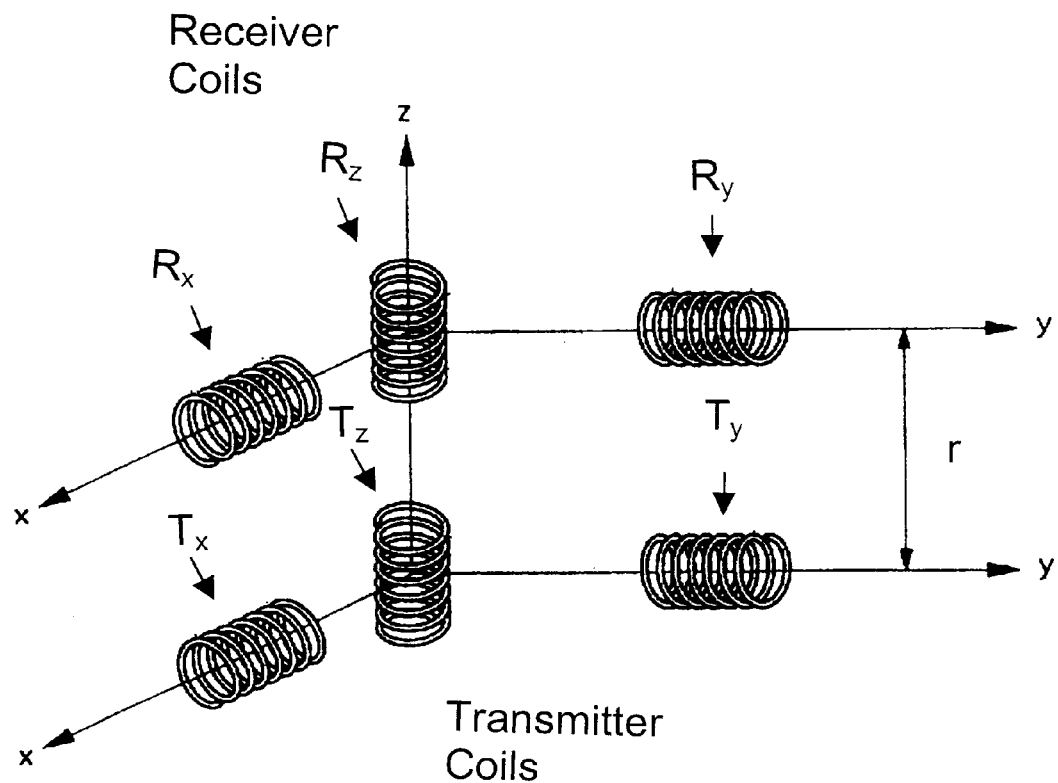
FIG. 1 is an illustration of a tri-axial antenna configuration for use as a transmitter-receiver array in accord with the invention.

The present invention concerns the processing of EM signal data to determine various parameters of subsurface formations. Therefore, the present disclosure is focused on the derivation of mathematical formulas for the inversion of the acquired data into useful values representative of the formation parameters. It will be appreciated by those skilled in the art that these signal data may be acquired using conventional logging tools.

Moran, J. H. and Gianzero, S., "Effects of formation anisotropy on resistivity-logging measurements", Geophysics, V, 44, No. 7, July 1979, pp. 1266–1286 (incorporated herein by reference), have derived closed form expressions for the radiation of a magnetic dipole in a homogenous anisotropic medium. In their original solution for the Hertz vector potential and magnetic scalar potential, Moran-Gianzero formulas are stated in the Cartesian coordinate system, which is tied to the formation, with the z-axis being perpendicular to the bedding planes. In the case of arbitrary tool axis orientation of a general tri-axial tool, the measured responses need to be rotated in order to compute all the couplings, i.e., the voltages induced at the receiver coils by respective transmitter coils. This yields rather complicated expressions.

The homogenous anisotropic formation with transverse anisotropy, having horizontal and vertical conductivity $\sigma_h$ and $\sigma_v$, respectively is considered. The antenna or field source is treated as a magnetic dipole of strength M located at x=0, y=0, z=0. The usual anisotropy coefficient $\lambda^2$, horizontal and vertical wave constants and relevant distances are defined as $$\lambda^2 = \frac{\sigma_h}{\sigma_v} \qquad r^2 = x^2 + y^2 + z^2 \qquad (1)$$

$$k_h^2 = i\omega\mu\sigma_h \qquad s^2 = x^2 + y^2 + \lambda^2 z^2$$

$$k_v^2 = i\omega\mu\sigma_v \qquad \rho^2 = x^2 + y^2.$$

The electric and magnetic field vectors are computed from the Hertz vector potential $\pi$ and the magnetic scalar potential $\Phi$ $$\hat{\sigma}E = i\omega\mu_0\sigma_v\nabla\times\pi \qquad (2)$$

$$H = i\omega\mu\sigma_h\pi + \nabla\Phi \qquad (3)$$

Potentials are linked by the gauge (Moran and Gianzero, 1979)

$$\nabla\cdot(\hat{\sigma}\pi) = \sigma_v\Phi \qquad (4)$$

The magnetic field vector is computed using the Hertz vector potential $\pi$ and the magnetic scalar potential $\Phi$. Expressions given in Table I (Moran and Gianzero, 1979) are:

x-excitation (5)

$$M_x = M,\ M_y = 0,\ M_z = 0$$

$$\pi = \frac{M}{4\pi\lambda}\frac{e^{ik_v s}}{s}\hat{x} + \frac{M\,x}{4\pi\rho^2}\left(\lambda z\frac{e^{ik_v s}}{s} - z\frac{e^{ik_h r}}{r}\right)\hat{z}$$

$$\Phi = \frac{M}{4\pi}\frac{ik_h x}{\rho^2}\left(e^{ik_v s} - e^{ik_h r} + \frac{\rho^2}{r^2}\left(1 - \frac{1}{ik_h r}\right)e^{ik_h r}\right),$$

y-excitation (6)

$$M_x = 0,\ M_y = M,\ M_z = 0$$

$$\pi = \frac{M}{4\pi\lambda}\frac{e^{ik_v s}}{s}\hat{y} + \frac{M\,y}{4\pi\rho^2}\left(\lambda z\frac{e^{ik_v s}}{s} - z\frac{e^{ik_h r}}{r}\right)\hat{z}$$

$$\Phi = \frac{M}{4\pi}\frac{ik_h y}{\rho^2}\left(e^{ik_v s} - e^{ik_h r} + \frac{\rho^2}{r^2}\left(1 - \frac{1}{ik_h r}\right)e^{ik_h r}\right),$$

z-excitation (7)

$$M_x = 0,\ M_y = 0,\ M_z = M$$

$$\pi = \frac{M}{4\pi}\frac{e^{ik_h s}}{r}\hat{z}$$

$$\Phi = \frac{M}{4\pi}\frac{ik_h z}{r^2}\left(1 - \frac{1}{ik_h r}\right)e^{ik_h r}.$$

Figure 2:
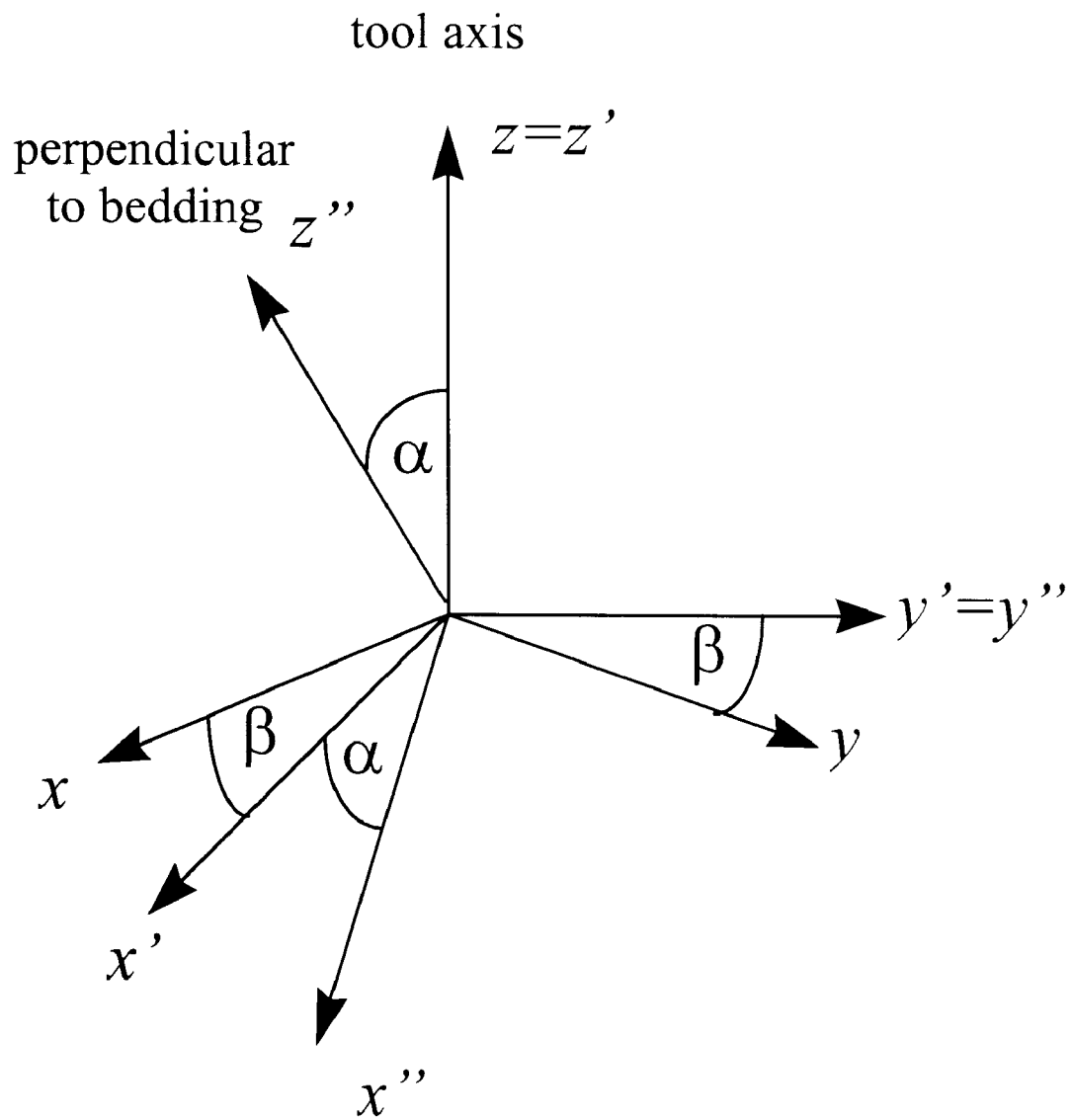
FIG. 2 is an illustration of formation and tool coordinate systems with corresponding angles.

Expression for a magnetic field in the formation coordinate system: A transfer matrix T" relates field H" and magnetic dipole moment of the source M" in the formation coordinate system $$H'' = T'' \cdot M'' = \begin{bmatrix} T''_{xx} & T''_{xy} & T''_{xz} \\ T''_{yx} & T''_{yy} & T''_{yz} \\ T''_{zx} & T''_{zy} & T''_{zz} \end{bmatrix} \cdot \begin{bmatrix} M_x \\ M_y \\ M_z \end{bmatrix}, \quad (8)$$

where $T_{n1n2}$=(coupling between n1-axis receiver antenna, n2-axis transmitter antenna). FIG. 2 shows the coordinate systems and corresponding rotation angles described herein.

In FIG. 2, x"-y"-z" represents the formation coordinate system and x-y-z the tool coordinates system, $\alpha$ is the relative dip angle, and $\beta$ is the dip-azimuth (strike) angle. Distances $\rho$ and s and coordinates x, y and z may be written in terms of transmitter-receiver spacing r, dip angle $\alpha$, and the dip-azimuth angle $\beta$:

$\rho^2 = r^2 \sin^2 \alpha$ $x = -r \sin \alpha$ $z = r \cos \alpha$ $y = 0$ $s = r\sqrt{\sin^2\alpha + \lambda^2 \cos^2 \alpha}$ \hfill (9)

The transfer matrix T" and Equations in expressions (3)–(7) are differentiated and simplified analytically in the formation coordinate system (with the z axis perpendicular to the bedding planes)

$$T'' = \begin{bmatrix} T''_{xx} & T''_{xy} & T''_{xz} \\ T''_{yx} & T''_{yy} & T''_{yz} \\ T''_{zx} & T''_{zy} & T''_{zz} \end{bmatrix} = T_h \cdot I + (L_h - T_h) \cdot \quad (10)$$

$$\begin{bmatrix} \sin^2\alpha & 0 & -\sin\alpha\cos\alpha \\ 0 & 0 & 0 \\ -\sin\alpha\cos\alpha & 0 & \cos^2\alpha \end{bmatrix} +$$

$$\frac{1}{4\pi}\left(\frac{k_v k_h}{s}e^{ik_v s} - \frac{k_h^2}{r}e^{ik_h r}\right) \cdot \begin{bmatrix} 0 & 0 & 0 \\ 0 & 1 & 0 \\ 0 & 0 & 0 \end{bmatrix} +$$

$$\frac{ik_h}{4\pi r^2 \sin^2\alpha}(e^{ik_v s} - e^{ik_h r}) \cdot \begin{bmatrix} -1 & 0 & 0 \\ 0 & 1 & 0 \\ 0 & 0 & 0 \end{bmatrix},$$

where I is the identity matrix and $L_h$ and $T_h$ are elementary functions corresponding to the couplings of longitudinal (axial) and transverse coil pairs separated by distance r in a homogenous isotropic medium of conductivity $\sigma_h$, i.e., $$T_h = \frac{e^{ik_h r}}{4\pi r^3}(-1 + ik_h r + k_h^2 r^2) \quad (11)$$

$$L_h = \frac{e^{ik_h r}}{2\pi r^3}(1 - ik_h r).$$

Expression for a magnetic field in the tool coordinate system: Equation (10) is transformed to the local coordinate system, where z' is the longitudinal tool axis, x' the transverse direction "North" (x' with z' defines the plane perpendicular to bedding), and y' is the other transverse direction ("East"), defined such that x'-y'-z' make a right-handed coordinate system. The rotation matrix is given by Moran and Gianzero, 1979:

$$R = \begin{bmatrix} \cos\alpha\cos\beta & \cos\alpha\sin\beta & -\sin\alpha \\ -\sin\beta & \cos\beta & 0 \\ \sin\alpha\cos\beta & \sin\alpha\sin\beta & \cos\alpha \end{bmatrix}. \quad (12)$$

The rotation may be decomposed into separate rotations about the z and y axes for angles $\beta$ and $\alpha$, respectively. Therefore, R may be written as a product of two rotation matrices:

$$R = R_\alpha \cdot R_\beta = \begin{bmatrix} \cos\alpha & 0 & -\sin\alpha \\ 0 & 1 & 0 \\ \sin\alpha & 0 & \cos\alpha \end{bmatrix} \cdot \begin{bmatrix} \cos\beta & \sin\beta & 0 \\ -\sin\beta & \cos\beta & 0 \\ 0 & 0 & 1 \end{bmatrix}. \quad (13)$$

As a first step, the rotation for angle $\alpha$ is performed. Then $$T' = R_\alpha^T \cdot T'' \cdot R_\alpha \quad (14)$$

relates magnetic dipole and field components in the new coordinate system tied to the tool:

$$H = T' \cdot M, \begin{bmatrix} H_{x1} \\ H_{y1} \\ H_{z1} \end{bmatrix} = T' \cdot \begin{bmatrix} M_{x1} \\ M_{y1} \\ M_{z1} \end{bmatrix}, \quad (15)$$

where $$T' = T_h \cdot I + (L_h - T_h) \cdot \begin{bmatrix} 0 & 0 & 0 \\ 0 & 0 & 0 \\ 0 & 0 & 1 \end{bmatrix} + \quad (16)$$

$$\frac{1}{4\pi}\left(\frac{k_v k_h}{s}e^{ik_v s} - \frac{k_h^2}{r}e^{ik_h r}\right) \cdot \begin{bmatrix} 0 & 0 & 0 \\ 0 & 1 & 0 \\ 0 & 0 & 0 \end{bmatrix} +$$

$$\frac{ik_h}{4\pi r^2 \sin^2\alpha}(e^{ik_h r} - e^{ik_v s}) \cdot$$

$$\begin{bmatrix} \cos^2\alpha & 0 & -\sin\alpha\cos\alpha \\ 0 & -1 & 0 \\ -\sin\alpha\cos\alpha & 0 & \sin^2\alpha \end{bmatrix}.$$

Expression (16) may be re-written as a sum of the response of a vertical tool (at relative dip $\alpha$=0) in a homogenous isotropic medium of conductivity $\sigma_h$, and two terms corresponding to coupling due to anisotropy and anisotropy and dipping:

$$T' = \begin{bmatrix} T_h & 0 & 0 \\ 0 & T_h & 0 \\ 0 & 0 & L_h \end{bmatrix} + \frac{1}{4\pi}\left(\frac{k_v k_h}{s}e^{ik_v s} - \frac{k_h^2}{r}e^{ik_h r}\right) \cdot \begin{bmatrix} 0 & 0 & 0 \\ 0 & 1 & 0 \\ 0 & 0 & 0 \end{bmatrix} + \quad (17)$$

$$\frac{ik_h}{4\pi r^2 \sin^2\alpha}(e^{ik_h r} - e^{ik_v s}) \cdot$$

$$\begin{bmatrix} \cos^2\alpha & 0 & -\sin\alpha\cos\alpha \\ 0 & -1 & 0 \\ -\sin\alpha\cos\alpha & 0 & \sin^2\alpha \end{bmatrix}.$$

It should be noted that in the limit $\alpha \to 0$, the last two terms become $$\lim_{\alpha \to 0}\left(\frac{k_v k_h}{s}e^{ik_v s} - \frac{k_h^2}{r}e^{ik_h r}\right) \cdot = \frac{k_v^2 - k_h^2}{r}e^{ik_h r} \quad (18)$$

$$\lim_{\alpha \to 0}\left(\frac{ik_h}{r^2 \sin^2 \alpha}(e^{ik_h r} - e^{ik_v s})\right) = \frac{k_v^2 - k_h^2}{2r}e^{ik_h r}.$$

The additional rotation for the strike angle $\beta$ gives the following relation between the field and magnetic dipole strength components:

$$H = T \cdot M, \begin{bmatrix} H_x \\ H_y \\ H_z \end{bmatrix} = T \cdot \begin{bmatrix} M_x \\ M_y \\ M_z \end{bmatrix} \quad (19)$$

$$T = R_\beta^T \cdot T' \cdot R_\beta \quad (20)$$

i.e., $$T = \begin{bmatrix} T_h & 0 & 0 \\ 0 & T_h & 0 \\ 0 & 0 & L_h \end{bmatrix} + \frac{1}{4\pi}\left(\frac{k_v k_h}{s}e^{ik_v s} - \frac{k_h^2}{r}e^{ik_h r}\right) \cdot \quad (21)$$

$$\begin{bmatrix} \sin^2\beta & -\sin\beta\cos\beta & 0 \\ -\sin\beta\cos\beta & \cos^2\beta & 0 \\ 0 & 0 & 0 \end{bmatrix} + \frac{ik_h}{4\pi r^2 \sin^2\alpha}(e^{ik_h r} - e^{ik_v s}) \cdot$$

$$\begin{bmatrix} \cos^2\alpha - (1+\cos^2\alpha)\sin^2\beta & (1+\cos^2\alpha)\sin\beta\cos\beta & -\sin\alpha\cos\alpha\cos\beta \\ (1+\cos^2\alpha)\sin\beta\cos\beta & -1+(1+\cos^2\alpha)\sin^2\beta & -\sin\alpha\cos\alpha\sin\beta \\ -\sin\alpha\cos\alpha\cos\beta & -\sin\alpha\cos\alpha\sin\beta & \sin^2\alpha \end{bmatrix}$$

Extracting conductivities and dip and strike angles from tri-axial measurements: From Equation (21), it is possible to extract the strike angle $\beta$, $$\beta = \tan^{-1}\frac{T_{yz}}{T_{xz}}, \text{ or, alternatively,} \quad (22)$$

$$\beta = \tan^{-1}\frac{2 T_{xy}}{T_{xx} - T_{yy}}. \quad (23)$$

After deriving $\beta$, it is possible to do the rotation to the primed coordinate system and to use Equation (17) to determine the dip angle $\alpha$ and horizontal and vertical conductivity $\sigma_h$ and $\sigma_v$. Couplings from Equation (17) are simplified to $$T'_{xx} = T_h + \frac{ik_h}{4\pi r^2}(e^{ik_h r} - e^{ik_v s}) \cdot \cot^2\alpha \quad (24)$$

$$T'_{xz} = -\frac{ik_h}{4\pi r^2}(e^{ik_h r} - e^{ik_v s}) \cdot \cot\alpha$$

$$T'_{zz} = L_h + \frac{ik_h}{4\pi r^2}(e^{ik_h r} - e^{ik_v s})$$

$$= \frac{e^{ik_h r}}{2\pi r^3} - \frac{ik_h}{4\pi r^2}(e^{ik_h r} + e^{ik_v s})$$

$$T'_{yy} = T_h + \frac{1}{4\pi}\left\{\left(\frac{k_v k_h}{s} + \frac{ik_h}{4\pi r^2}\right)e^{ik_v s} - \left(\frac{k_h^2}{r} + \frac{ik_h}{4\pi r^2 \sin^2\alpha}\right)e^{ik_h r}\right\}.$$

System (24) may be solved using a least-squares technique. The resulting values may then be substituted in the following equations to derive the desired formation parameters.

After a trivial algebraic manipulation of system (24), an equation having horizontal conductivity as the only unknown is obtained:

$$(T'_{zz} - L_h)(T'_{xx} - T_h) = (T'_{xz})^2. \quad (25)$$

Now, the dip angle can be determined by combining the first two equations of system (24), $$T'_{xx} = T_h - T'_{xz} \cdot \cot\alpha \quad (26)$$

or, $$\alpha = \tan^{-1}\frac{T'_{xz}}{T_h - T'_{xx}}. \quad (27)$$

The vertical conductivity is obtained from the third equation of system (24). An identity that can be used is:

$$T'_{xx} + T'_{yy} + T'_{zz} = \frac{1}{4\pi}\left(\frac{k_h^2}{r}e^{ik_h r} + \frac{k_h k_v}{s}e^{ik_v s}\right). \quad (28)$$

Low frequency limit expressions for conductivities and dip and strike angles: Closed form expressions for these four parameters may also be derived in the low frequency limit, i.e., for $(k_h r) \to 0$ and $(k_v r) \to 0$.

In the low frequency limit, the following is valid:

$$\lim_{\substack{k_h r \to 0 \\ k_v r \to 0}}(\text{Re}\{T'_{xx}\}) = \lim_{\substack{k_h r \to 0 \\ k_v r \to 0}}(\text{Re}\{T_h\}) = -\frac{1}{4\pi r^3} \quad (29)$$

$$\lim_{\substack{k_h r \to 0 \\ k_v r \to 0}}(\text{Re}\{T'_{yy}\}) = \lim_{\substack{k_h r \to 0 \\ k_v r \to 0}}(\text{Re}\{T_h\}) = -\frac{1}{4\pi r^3}$$

$$\lim_{\substack{k_h r \to 0 \\ k_v r \to 0}}(\text{Re}\{T'_{zz}\}) = \lim_{\substack{k_h r \to 0 \\ k_v r \to 0}}(\text{Re}\{L_h\}) = \frac{1}{2\pi r^3}$$

$$\lim_{\substack{k_h r \to 0 \\ k_v r \to 0}}(\text{Re}\{T'_{xz}\}) = 0$$

and $$\lim_{\substack{k_h r \to 0 \\ k_v r \to 0}} (\text{Im}\{T_h\}) = \frac{k_h^2}{8\pi r} \quad (30)$$

$$\lim_{\substack{k_h r \to 0 \\ k_v r \to 0}} (\text{Im}\{T_h\}) = \frac{k_h^2}{8\pi r}$$

$$\lim_{\substack{k_h r \to 0 \\ k_v r \to 0}} (\text{Im}\{L_h\}) = \frac{k_h^2}{4\pi r}.$$

Then, Equations (22)–(28) can be further simplified and approximate expressions for horizontal and vertical conductivity, apparent dip and strike angle are obtained as follows. The dip-azimuth angle is computed from Equation (22) or (23), $$\beta = \tan^{-1}\frac{\text{Im}\{T_{yz}\}}{\text{Im}\{T_{xz}\}} \quad (31)$$

or, $$\beta = \tan^{-1}\frac{2\,\text{Im}\{T_{xy}\}}{\text{Im}\{T_{xx}\} - \text{Im}\{T_{yy}\}}. \quad (32)$$

$$\left(\text{Im}\{T'_{zz}\} - \frac{k_h^2}{4\pi r}\right)\left(\text{Im}\{T'_{xx}\} - \frac{k_h^2}{8\pi r}\right) = \text{Im}\{T'_{xz}\}^2 \quad (33)$$

or, $$\frac{k_h^2}{8\pi r}(2\,\text{Im}\{T'_{xx}\} - \text{Im}\{T'_{zz}\}) - \frac{k_h^4}{32\pi^2 r^2} \quad (34)$$
$$= \text{Im}\{T'_{xx}\}\text{Im}\{T'_{zz}\} - \text{Im}\{T'_{xz}\}^2.$$

In the low frequency limit $k_h^4$ can be neglected, so $k_h^2$ can be computed as $$k_h^2 = 8\pi r \frac{\text{Im}\{T'_{xx}\}\text{Im}\{T'_{zz}\} - \text{Im}\{T'_{xz}\}^2}{2\,\text{Im}\{T'_{xx}\} - \text{Im}\{T'_{zz}\}}. \quad (35)$$

Equation (35) yields an approximate formula for horizontal conductivity, $$\sigma_h = \frac{8\pi r}{\omega\mu}\frac{\text{Im}\{T'_{xx}\}\text{Im}\{T'_{zz}\} - \text{Im}\{T'_{xz}\}^2}{2\,\text{Im}\{T'_{xx}\} - \text{Im}\{T'_{zz}\}}. \quad (36)$$

Apparent dip can be computed from Equation (27), $$\alpha = \tan^{-1}\frac{\text{Im}\{T'_{xz}\}}{\frac{k_h^2}{8\pi r} - \text{Im}\{T'_{xx}\}}. \quad (37)$$

The vertical conductivity may be computed from Equation (28). The expression for $T_{zz}'$ from system (24) may look simpler, but it should be noted that it is not possible to determine $\sigma_v$ for $\alpha=0$. Therefore, system (24) in the low frequency limit becomes, $$\text{Im}\{T'_{xx}\} + \text{Im}\{T'_{yy}\} + \text{Im}\{T'_{zz}\} = \frac{1}{4\pi}\left(\frac{k_h^2}{r} + \frac{k_h k_v}{s}\right), \quad (38)$$

or, in terms of anisotropy coefficient $\lambda$, $$\text{Im}\{T'_{xx}\} + \text{Im}\{T'_{yy}\} + \text{Im}\{T'_{zz}\} = \frac{k_h^2}{4\pi r}\left(1 + \frac{1}{\lambda\sqrt{\sin^2\alpha + \lambda^2\cos^2\alpha}}\right). \quad (39)$$

Solving Equation (39) gives solutions for $\lambda$ and $\sigma_v$, $$\lambda^2 = \frac{1}{2}\left\{\sqrt{\left(\frac{4\pi r(\text{Im}\{T'_{xx}\} + \text{Im}\{T'_{yy}\} + \text{Im}\{T'_{zz}\})}{k_h^2} - 1\right)^2 + \tan^4\alpha} - \tan^2\alpha\right\}, \quad (40)$$

$$\sigma_v = \frac{\sigma_h}{\lambda^2} = \quad (41)$$

$$2\sigma_h\left\{\sqrt{\left(\frac{4\pi r(\text{Im}\{T'_{xx}\} + \text{Im}\{T'_{yy}\} + \text{Im}\{T'_{zz}\})}{k_h^2} - 1\right)^2 + \tan^4\alpha} - \tan^2\alpha\right\}^{-1}.$$

FIG. 3 shows a flow chart outlining a process of the invention. At 50, the couplings between respective receiver and transmitter antennas are acquired as described above. At 55, the horizontal conductivity of the formation is determined by solving Equation (25) as derived from the coupling computations set forth above. At 60, the relative dip angle is computed from Equation (27). And at 65, the vertical conductivity of the formation is computed from Equation (28).

Figure 4:
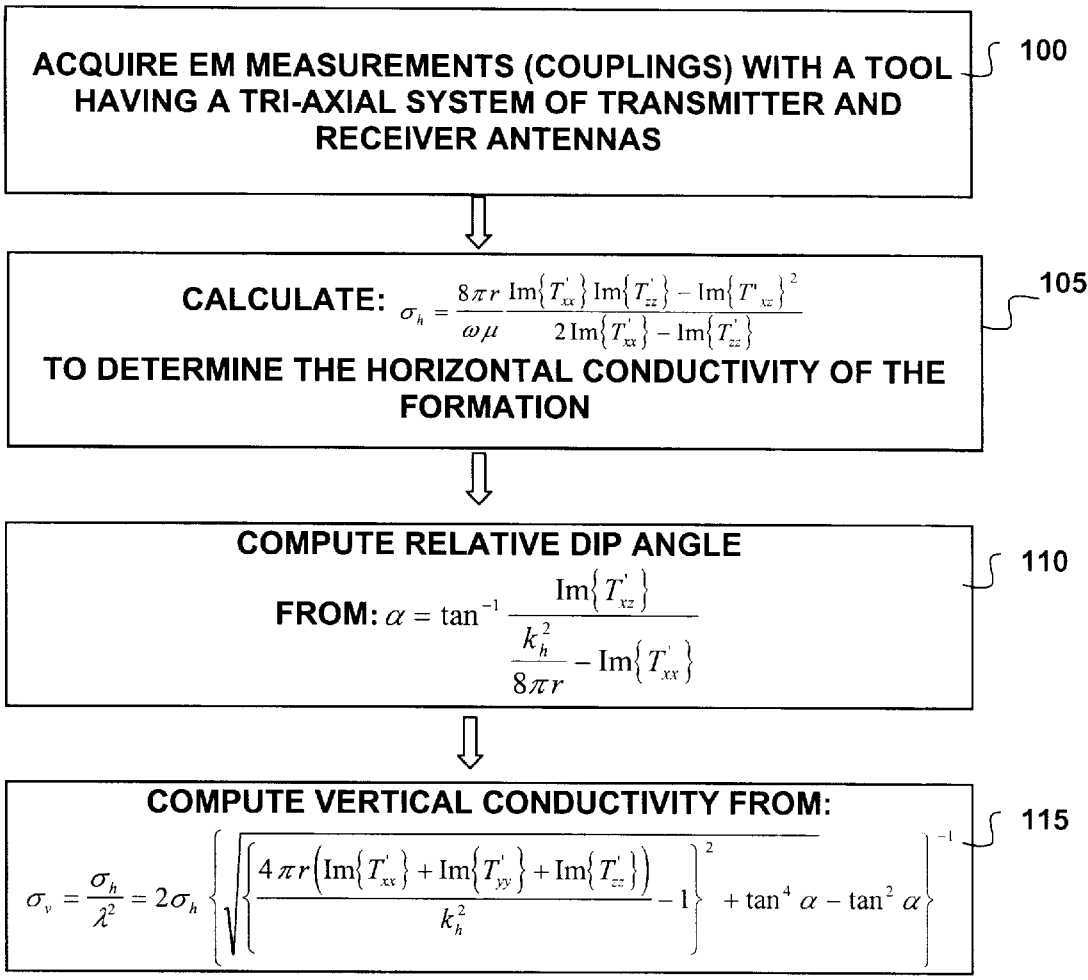
FIG. 4 shows a flow chart of a method for determining a parameter of a subsurface formation from electromagnetic measurements in a low frequency limit according to the invention.

FIG. 4 shows another flow chart outlining a process of the invention. At 100, the couplings between respective receiver and transmitter antennas are acquired as described above. At 105, the horizontal conductivity of the formation is determined by calculation of Equation (36) as derived from the coupling computations set forth above. At 110, the relative dip angle is computed from Equation (37). And at 115, the vertical conductivity of the formation is computed from Equation (41).

Program storage device: It will be apparent to those of ordinary skill having the benefit of this disclosure that the invention may be implemented by programming one or more suitable general-purpose computers to perform algebraic calculations. The programming may be accomplished through the use of one or more program storage devices readable by the computer processor and encoding one or more programs of instructions executable by the computer for performing the operations described above. The program storage device may take the form of, e.g., one or more floppy disks; a CD-ROM or other optical disk; a magnetic tape; a read-only memory chip (ROM); and other forms known in the art or subsequently developed. The program of instructions may be "object code," i.e., in binary form that is executable more-or-less directly by the computer; in "source code" that requires compilation or interpretation before execution; or in some intermediate form such as partially compiled code. The precise forms of the program storage device and of the encoding of instructions are immaterial here. Alternatively, the expressions of the invention may be computed using commercial software, such as MATHEMATICA or MATLAB.

Figure 5:
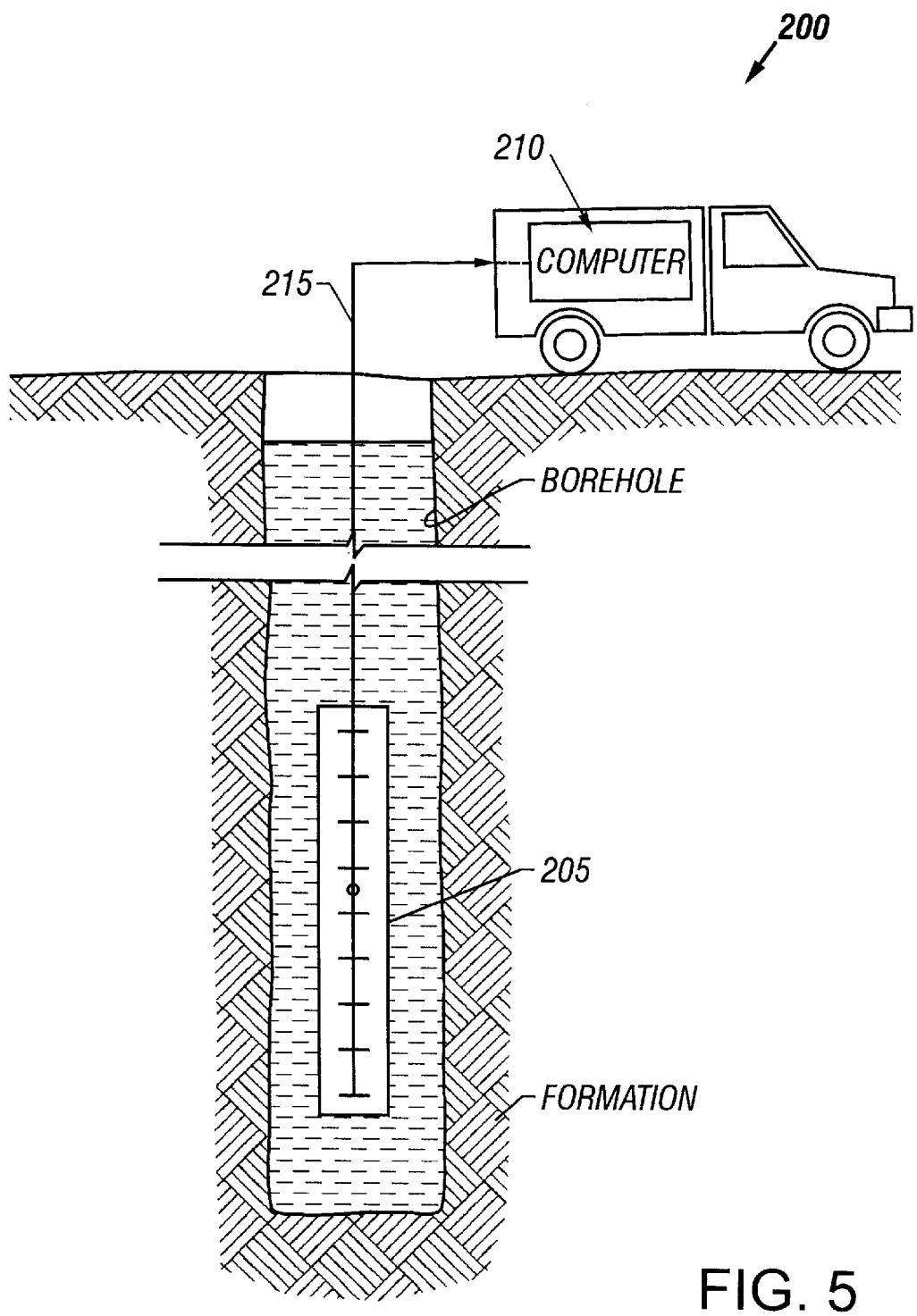
FIG. 5 is a schematic diagram of a well logging system in accord with the invention.

Logging system: The present invention can be implemented in a logging system 200 with a logging tool 205 adapted to be moveable through a borehole and an apparatus 210 coupled to the tool 205 as shown in FIG. 5. Certain conventional details are omitted in FIG. 5 for clarity of illustration. The apparatus 210 comprises a surface computer (such as the general-purpose computer and program storage device described above) coupled to the tool 205 by a wireline cable 215. The tool 205 may be any conventional induction tool that embodies a tri-axial antenna configuration. It will be appreciated by those skilled in the art that the techniques of the invention may be implemented in wireline or while-drilling operations.

The formation parameters can be determined in near real-time by sending the measured response data to the surface as they are acquired, or it can be determined from a recorded-mode by recording the data on a suitable recordable medium. The system of FIG. 5 transmits the measured data from the tool 205 to the surface computer 210 by electronics (not shown) housed in the tool 205. The data may be sent to the surface computer 210 along the wireline cable 215 or by known telemetry techniques as known in the art for while-drilling applications. It will be understood that alternative means can be employed for communicating the acquired data to the surface as the precise form of communication is immaterial to the implementation of the disclosed techniques.

Once received by the surface computer 210, the data can be recorded, processed, or computed as desired by the user to generate the desired formation parameters. The parameter values can then be recorded or displayed on a suitable medium. Alternatively, some or all of the processing can be performed downhole and the data can be recorded uphole, downhole, or both.

The invention may be implemented in a system having a plurality of antennas or coils as known in the art. Such antennas may be placed on the logging tool in various sets or configurations and operated at various frequencies to obtain the desired EM measurements. For example, when used for induction-type measurements, a system of the invention may include one or more "bucking" antennas (not shown) disposed near a transmitter or receiver antenna. It is well known that signals measured with induction frequencies are affected by direct transmitter-to-receiver coupling. Thus a bucking antenna is typically used to eliminate or reduce these coupling effects. It will also be appreciated by those skilled in the art that the axial spacing and placement of the antennas along the tool may be varied to alter the signal strength and measurement sensitivity.

While the systems and methods of this invention have been described as specific embodiments, it will be apparent to those skilled in the art that variations may be applied to the structures and in the steps or in the sequence of steps of the methods described herein without departing from the concept and scope of the invention. All such similar variations apparent to those skilled in the art are deemed to be within the scope of the invention as defined by the claims.

What is claimed is:

1. A method for determining a parameter of a subsurface formation from electromagnetic measurements acquired with a logging tool disposed within said formation, said tool adapted with a tri-axial system of transmitter and receiver antennas, comprising:

a) determining couplings associated with said measurements; and b) calculating the following expression derived from said couplings to determine the horizontal conductivity ($\sigma_h$) of said formation:

$$(T'_{zz} - L_h)(T'_{xx} - T_h) = (T'_{xz})^2,$$

where $T'_{zz}$ is the coupling between a z-axis receiver antenna and a z-axis transmitter antenna;

$T'_{xx}$ is the coupling between an x-axis receiver antenna and an x-axis transmitter antenna;

$T'_{xz}$ is the coupling between an x-axis receiver antenna arid a z-axis transmitter antenna;

$L_h$, $T_h$ are elementary functions corresponding to said couplings of said antennas:

$$T_h = \frac{e^{ik_h r}}{4\pi r^3}(-1 + ik_h r + k_h^2 r^2), \quad L_h = \frac{e^{ik_h r}}{2\pi r^3}(1 - ik_h r);$$

r is the separation distance between the antennas; and $k_h^2 = i\omega\mu\sigma_h$.

2. The method of claim 1 wherein step (a) includes rotating said couplings to a coordinate system associated with said tool.

3. The method of claim 1 wherein step (a) includes calculating either of the following expressions to derive a dip-azimuth angle β:

$$\beta = \tan^{-1}\frac{T_{yz}}{T_{xz}}, \text{ or}$$

$$\beta = \tan^{-1}\frac{2T_{xy}}{T_{xx} - T_{yy}},$$

where $T_{yz}$ is the coupling between a y-axis receiver antenna and a z-axis transmitter antenna;

$T_{xz}$ is the coupling between an x-axis receiver antenna and a z-axis transmitter antenna;

$T_{xy}$ is the coupling between an x-axis receiver antenna and a y-axis transmitter antenna;

$T_{xx}$ is the coupling between an x-axis receiver antenna and an x-axis transmitter antenna; and $T_{yy}$ is the coupling between a y-axis receiver antenna and a y-axis transmitter antenna.

4. The method of claim 1 wherein step (a) includes rotating said couplings using a matrix including a term corresponding to dip-azimuth.

5. The method of claim 3 further comprising:

(c) calculating a dip angle using said couplings.

6. The method of claim 5 further comprising:

(d) calculating the vertical conductivity of said formation using said couplings.

7. The method of claim 6 wherein a least-squares technique is applied to at least one of steps (b), (c), or (d).

8. A method for determining a parameter of a subsurface formation from electromagnetic measurements acquired with a logging tool disposed within said formation, said tool adapted with a tri-axial system of transmitter and receiver antennas, comprising:

a) determining couplings associated with said measurements; and b) calculating the following expression derived from said couplings to determine the horizontal conductivity $\sigma_h$ of said formation:

$$\sigma_h = \frac{8\pi r}{\omega\mu}\frac{\text{Im}\{T'_{xx}\}\text{Im}\{T'_{zz}\} - \text{Im}\{T'_{xz}\}^2}{2\text{Im}\{T'_{xx}\} - \text{Im}\{T'_{zz}\}},$$

where $T'_{xx}$ is the coupling between an x-axis receiver antenna and an x-axis transmitter antenna;

$T'_{zz}$ the coupling between a z-axis receiver antenna and a z-axis transmitter antenna;

$T_{xz}$ is the coupling between an x-axis receiver antenna and a z-axis transmitter antenna;

ω represents an angular frequency;

r is a separation distance between said antennas; and

μ is a magnetic permeability constant.

9. The method of claim 8 wherein step (a) includes rotating said couplings to a coordinate system associated with said tool.

10. The method of claim 8 wherein step (a) includes calculating either of the following expressions to derive a strike angle β:

$$\beta = \tan^{-1} \frac{\text{Im}\{T_{yz}\}}{\text{Im}\{T_{xz}\}}, \text{ or}$$

$$\beta = \tan^{-1} \frac{2\,\text{Im}\{T_{xy}\}}{\text{Im}\{T_{xx}\} - \text{Im}\{T_{yy}\}},$$

where $T_{yz}$ is the coupling between a y-axis receiver coil and a z-axis transmitter coil of said antennas;

$T_{xz}$ is the coupling between an x-axis receiver coil and a z-axis transmitter coil of said antennas;

$T_{xy}$ is the coupling between an x-axis receiver coil and a y-axis transmitter coil of said antennas;

$T_{xx}$ is the coupling between an x-axis receiver coil and an x-axis transmitter coil of said antennas; and $T_{yy}$ is the coupling between a y-axis receiver coil and a y-axis transmitter coil of said antennas.

11. The method of claim 10 further comprising:

c) calculating the following expressions to derive a dip angle α:

$$\alpha = \tan^{-1} \frac{\text{Im}\{T'_{xz}\}}{\frac{k_h^2}{8\pi r} - \text{Im}\{T'_{xx}\}},$$

where $k_h^2$ is a horizontal wave constant.

12. The method of claim 11 further comprising:

d) calculating the following expression to derive the vertical conductivity $\sigma_v$ of said formation:

$$\sigma_v = \frac{\sigma_h}{\lambda^2} = 2\sigma_h \left\{ \sqrt{\left(\frac{4\pi r (\text{Im}\{T'_{xx}\} + \text{Im}\{T'_{yy}\} + \text{Im}\{T'_{zz}\})}{k_h^2} - 1\right)^2 + \tan^4\alpha} - \tan^2\alpha \right\}^{-1}.$$

where λ is an anisotropy coefficient.

13. A system for determining a parameter of a subsurface formation from electromagnetic measurements, comprising:

a tool adapted for disposal within said formation, said tool equipped with a tri-axial system of transmitter and receiver antennas for acquiring said measurements; and computation means for (i) determining couplings associated with said measurements; and (ii) calculating the following expression derived from said couplings to determine the horizontal conductivity ($\sigma_h$) of said formation:

$$(T'_{zz} - L_h)(T'_{xx} - T_h) = (T'_{xz})^2,$$

where $T'_{zz}$ is the coupling between a z-axis receiver antenna and a z-axis transmitter antenna;

$T'_{xx}$ is the coupling between an x-axis receiver antenna and an x-axis transmitter antenna;

$T'_{xz}$ is the coupling between an x-axis receiver antenna and a z-axis transmitter antenna;

$L_h$, $T_h$ are elementary functions corresponding to the couplings of said antennas:

$$T_h = \frac{e^{ik_h r}}{4\pi r^3}(-1 + ik_h r + k_h^2 r^2), \quad L_h = \frac{e^{ik_h r}}{2\pi r^3}(1 - ik_h r);$$

r is the separation distance between the antennas and $k_h^2 = i\omega\mu\sigma_h$.

14. The system of claim 13, said computation means further comprising means for calculating either of the following expressions to derive a strike angle β:

$$\beta = \tan^{-1} \frac{T_{yz}}{T_{xz}}, \text{ or}$$

$$\beta = \tan^{-1} \frac{2T_{xy}}{T_{xx} - T_{yy}},$$

where $T_{yz}$ is the coupling between a y-axis receiver antenna and a z-axis transmitter antenna;

$T_{xz}$ is the coupling between an x-axis receiver antenna and a z-axis transmitter antenna;

$T_{xy}$ is the coupling between an x-axis receiver antenna and a y-axis transmitter antenna;

$T_{xx}$ is the coupling between an x-axis receiver antenna and an x-axis transmitter antenna; and $T_{yy}$ is the coupling between a y-axis receiver antenna and a y-axis transmitter antenna.

15. The system of claim 14, said computation means further comprising means for calculating a dip angle using said couplings.

16. The system of claim 15, said computation means further comprising means for calculating the vertical conductivity of said formation using said couplings.

17. The system of claim 16 wherein said calculation means applies a least-squares technique in said calculations.

18. A system for determining a parameter of a subsurface formation from electromagnetic measurements, comprising:

a tool adapted for disposal within said formation, said tool equipped with a tri-axial system of transmitter and receiver antennas for acquiring said measurements; and computation means for a) determining couplings associated with said measurements; and b) calculating the following expression derived from said couplings to determine the horizontal conductivity $\sigma_h$ of said formation:

$$\sigma_h = \frac{8\pi r}{\omega\mu} \frac{\text{Im}\{T'_{xx}\}\text{Im}\{T'_{zz}\} - \text{Im}\{T'_{xz}\}^2}{2\text{Im}\{T'_{xx}\} - \text{Im}\{T'_{zz}\}},$$

where $T'_{xx}$ is the coupling between an x-axis receiver antenna and an x-axis transmitter antenna;

$T'_{zz}$ is the coupling between a z-axis receiver antenna and a z-axis transmitter antenna;

$T'_{xz}$ is the coupling between an x-axis receiver antenna and a z-axis transmitter antenna;

ω represents an angular frequency;
r is a separation distance between said antennas; and
μ is a magnetic permeability constant.

19. The system of claim 18, said computation means further comprising means for calculating either of the following expressions to derive a strike angle β:

$$\beta = \tan^{-1} \frac{\text{Im}\{T_{yz}\}}{\text{Im}\{T_{xz}\}}, \text{ or}$$

$$\beta = \tan^{-1} \frac{2\text{Im}\{T_{xy}\}}{\text{Im}\{T_{xx}\} - \text{Im}\{T_{yy}\}},$$

where
- $T_{yz}$ is the coupling between a y-axis receiver antenna and a z-axis transmitter antenna;
- $T_{xz}$ is the coupling between an x-axis receiver antenna and a z-axis transmitter antenna;
- $T_{xy}$ is the coupling between an x-axis receiver antenna and a y-axis transmitter antenna;
- $T_{xx}$ is the coupling between an x-axis receiver antenna and an x-axis transmitter antenna; and
- $T_{yy}$ is the coupling between a y-axis receiver antenna and a y-axis transmitter antenna.

20. The system of claim 19, said computation means further comprising means for calculating the following expressions to derive a dip angle α:

$$\alpha = \tan^{-1} \frac{\text{Im}\{T'_{xz}\}}{\frac{k_h^2}{8\pi r} - \text{Im}\{T'_{xx}\}},$$

where $k_h^2$ is a horizontal wave constant.

21. The system of claim 20, said computation means further comprising means for calculating the following expression to derive the vertical conductivity $\sigma_v$ of said formation:

$$\sigma_v = \frac{\sigma_h}{\lambda^2} =$$

$$2\sigma_h \left\{ \sqrt{\left(\frac{4\pi r(\text{Im}\{T'_{xx}\} + \text{Im}\{T'_{yy}\} + \text{Im}\{T'_{zz}\})}{k_h^2} - 1\right)^2 + \tan^4\alpha} - \tan^2\alpha \right\}^{-1}.$$

where λ is an anisotropy coefficient.

* * * * *